United States Patent [19]

Tanner

[11] 3,800,512

[45] Apr. 2, 1974

[54] FLEXIBLE FILTER ELEMENT

[75] Inventor: David N. Tanner, Kirkwood, Mo.

[73] Assignee: Arudale Manufacturers, Inc., St. Louis, Mo.

[22] Filed: July 6, 1971

[21] Appl. No.: 159,641

[52] U.S. Cl............. 55/357, 16/111 R, 16/DIG. 24, 16/DIG. 40, 55/497, 55/500, 55/511, 55/521, 55/522, 55/529, 210/498, 264/167, 264/DIG. 70

[51] Int. Cl............................................. B01d 39/14

[58] Field of Search ............. 55/497, 357, 490, 495, 55/499, 500, 502, 509, 511, 522, 523, 521, 529; 264/DIG. 70, 167; 210/483, 488, 493, 495, 498; 34/82, 133; 16/111, DIG. 24, DIG. 40

[56] References Cited
UNITED STATES PATENTS

| | | | |
|---|---|---|---|
| 1,890,499 | 12/1932 | Davies | 55/521 X |
| 2,297,729 | 10/1942 | Thomas | 55/DIG. 31 |
| 2,415,579 | 2/1947 | Dahlman | 55/499 |
| 2,423,741 | 7/1947 | Vokes et al. | 55/DIG. 31 |
| 2,664,375 | 12/1953 | Slayter | 55/489 X |
| 2,737,258 | 3/1956 | Harlow | 55/156 X |
| 3,285,637 | 11/1966 | Taussig | 16/111 R |
| 3,409,997 | 11/1968 | Cobb et al. | 34/133 |
| 3,505,792 | 4/1970 | Dahlem | 55/528 X |
| 3,660,968 | 5/1972 | Dyla et al. | 55/156 |
| 1,220,888 | 3/1917 | Porter | 55/500 X |
| 1,880,552 | 10/1932 | Ward | 55/521 X |
| 2,493,726 | 1/1950 | O'Day | 55/489 X |
| 2,801,709 | 8/1957 | Sze | 55/446 X |
| 3,107,991 | 10/1963 | Taussig | 264/257 X |
| 3,276,942 | 10/1966 | Ewing | 161/55 |
| 3,378,934 | 4/1968 | Erickson | 34/82 |
| 3,581,478 | 6/1971 | Smith | 98/40 X |
| 2,883,058 | 4/1959 | Jaume | 210/483 X |
| 2,230,765 | 2/1941 | Shimer | 55/509 X |
| 3,668,736 | 6/1972 | Loscalzo | 15/402 |

FOREIGN PATENTS OR APPLICATIONS

| | | | |
|---|---|---|---|
| 579,562 | 8/1946 | Great Britain | 210/497 |
| 874,424 | 5/1942 | France | 210/498 |
| 45-18,027 | 6/1970 | Japan | 264/167 |

OTHER PUBLICATIONS

"Sears Kenmore Owner's Manual For Your New Automatic Dryer," Sears, Roebuck and Co., Chicago, Illinois 60607, cover and pp. 1,2,3,4,5,9,13,19,21, June 1966.

"Lady Kenmore Model 900, Operating Instructions", Sears, Roebuck and Co., Chicago, Illinois 60607, 4 pages, June 1966.

"Parts List for Kenmore Electric Dryer", Sears Roebuck and Co., Chicago, Illinois 60607, 7 pages, June 1966.

Primary Examiner—Dennis E. Talbert, Jr.
Attorney, Agent, or Firm—Rogers, Ezell & Eilers

[57] ABSTRACT

A flexible filter element comprising a thermoplastic frame and a corrugated thermoplastic filter mesh medium within the frame, the frame and mesh being of unitary construction molded as a one-piece filter element.

8 Claims, 10 Drawing Figures

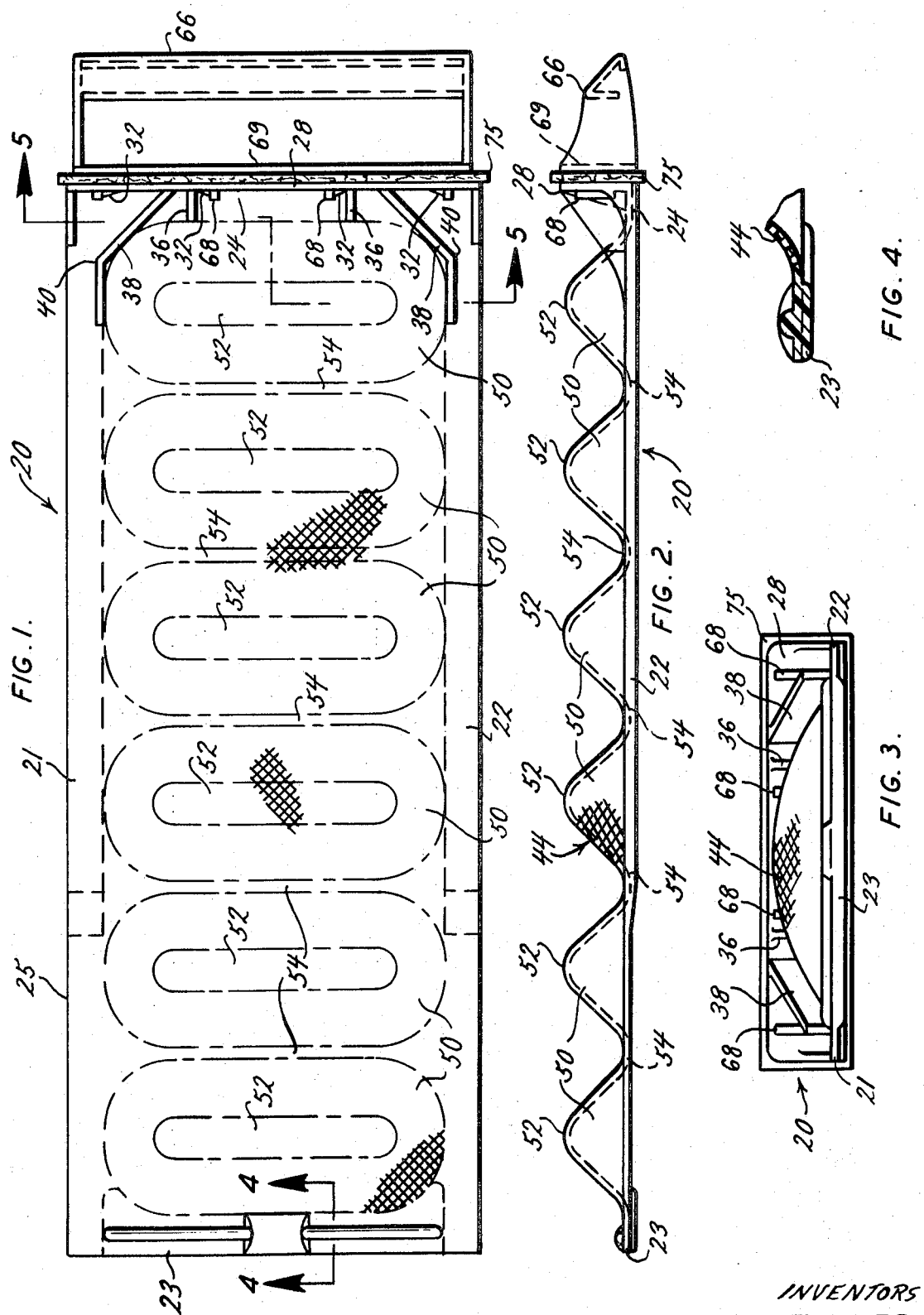

INVENTOR
BY DAVID N. TANNER
Rogers, Ezell, Eilers & Robbins
ATTORNEYS

FLEXIBLE FILTER ELEMENT

BACKGROUND OF THE INVENTION

This invention relates to flexible filter elements such as for use in applications requiring insertion of the elements on curved tracks or in curved chutes. Such elements, for example, may be used in filtering impurities from the air as in clothes driers and the like.

Prior art elements of this type comprise a rectangular frame of thermoplastic, and metallic or cloth screening overlying the frame with the edges of the screen molded into the frame druing the molding process. The frames are molded flat, but made sufficiently flexible to follow a curved track on installation.

These elements present several problems. When the frame is flat the screen is taut, but when the frame is curved, as on installation, the screen buckles and sags which can, in certain applications, adversely affect its filtering capability. Also, since the screen offers little support, the sides of the frame bow as force is applied to insert the element with the result that they leave the tracks and bind. To prevent this, the frame is molded with special tabs all along the lengths of its sides to hold them in the tracks.

The frictional drag created by the sagging screen and tabs requires greater force to push the element along the track and thereby requires the insertion of metallic reinforcing bands along the sides of the frame to keep them from buckling under the force.

Not only is the sagging screen unsatisfactory, but the molding process requiring a non-thermoplastic screen to be molded in a thermoplastic frame, the use of tabs all along the lengths of the frame sides, and the metallic reinforcing bands greatly increases the costs of the elements.

SUMMARY OF THE INVENTION

These problems are solved by the filter element of this invention to greatly reduce its cost. The filter element of this invention comprises a thermoplastic frame and a thermoplastic mesh filter medium within the frame, the frame and mesh being of unitary construction molded as a one-piece filter element. A suitable handle is provided at one end of the element for inserting the element in a curved track or chute.

The mesh is corrugated along its length to prevent sagging and buckling when the element is curved. The corrugations also help hold the sides of the frame parallel so as to stay in the tracks without special tabs. Without the tabs, metallic reinforcing bands are not required.

The result is a far superior, less expensive, flexible filter element.

DESCRIPTION OF THE DRAWINGS:

FIG. 1 is a plan view of the flexible filter element of this invention;

FIG. 2 is a front elevational view of the filter element of FIG. 1;

FIG. 3 is a left end elevational view of the filter element of FIG. 1;

FIG. 4 is a view in section taken along the line 4—4 of FIG. 1;

DETAILED DESCRIPTION OF A PREFERRED EMBODIMENT

Figure 5:
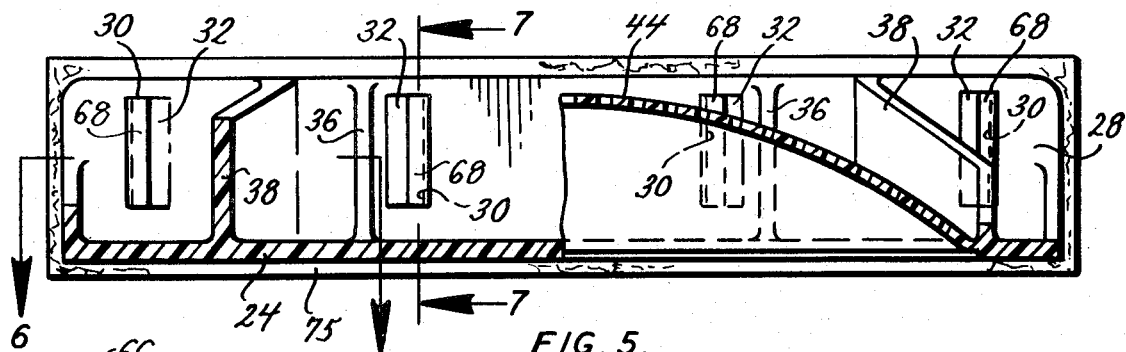
FIG. 5 is an enlarged view in section taken along the line 5—5 of FIG. 1.
Figure 6:
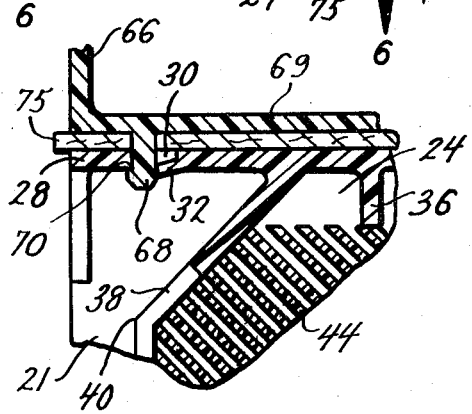
FIG. 6 is a view in section taken along the line 6—6 of FIG. 5.
Figure 7:
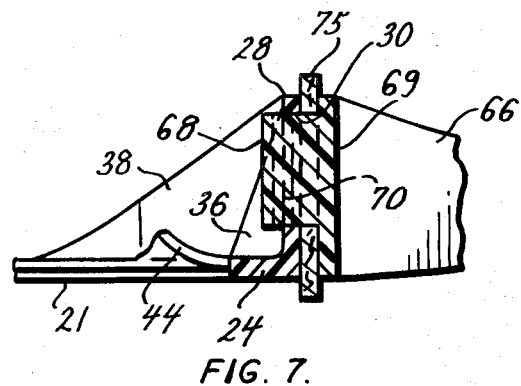
FIG. 7 is a view in section taken along the line 7—7 of FIG. 5.

In the drawing there is shown a filter element 20 of this invention having sides 21 and 22 and ends 23 and 24 defining a frame 25 of thermoplastic. At the end 24 is a vertical wall 28 formed of thermoplastic integrally with the frame 25 and having a series of spaced vertical slots 30 therein. The side of each slot 30 has a flexible thermoplastic flap 32 for purposes to be described. Between the wall 28 and frame 25 are vertical reinforcing ribs 36 which are generally triangular in shape, and vertical reinforcing ribs 38 which are also generally triangular in shape, but which are bent at 40 to extend from the wall 28 to the sides 21 and 22 of the frame 25. The reinforcing ribs 36 and 38 hold the wall 28 normal with respect to the frame 25 during installation of the element 20.

A thermoplastic mesh filter medium 44 covers the entire area within and is molded integrally with the frame 25, thereby providing a unitary filter element. The mesh 44 is formed in a series of dome-shaped corrugations 50 along the length of the element 20, which corrugations have sets of peaks 52 and 54. The corrugations 50 may be formed completely or partially above or below the frame 25 as the filtering application requires, but it is preferable that at least one set of peaks be formed at the plane of the frame 25 such as the peaks 54 as best shown in FIG. 2. With one set of peaks thus formed, the thermoplastic mesh 44 is taut between the sides 21 and 22 of the frame 25 at the locations of the peaks 54 to hold the sides parallel as they slide along a curved chute or track during installation. As noted from FIGS. 1, 2, 3, and 5, the depth of each corrugation, measured normally from the plane of the frame 25 to its peak 52, is greatest about midway between the sides 21 and 22 and decreases smoothly to zero nearest the sides (FIG. 3). Hence, the unitary molded filter element of this invention provides corrugations down the center of the element where needed with these corrugations diminishing to zero where the mesh connects to the noncorrugated sides 21 and 22. The magnitude or depth can be controlled at each mesh location to provide a continuous mesh surface without folds or the like. As seen in FIG. 3, in a preferred embodiment, each corrugation defines an arc in cross section taken through its longitudinal extent at a peak. The corrugations 50 provide pockets for collecting filtered impurities, and flexibility for preventing buckling of the screen 44 when the element is curved.

Figure 8:
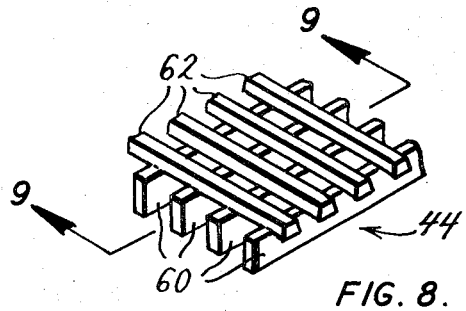
FIG. 8 is an enlarged view of a section of the thermoplastic mesh filter medium of this invention.
Figure 9:
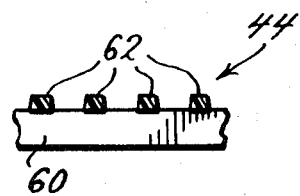
FIG. 9 is a view in section taken along the line 9—9 of FIG. 8.

FIGS. 8 and 9 show one pattern of thermoplastic mesh used as the filter medium 44. This mesh is characterized as having parallel ribs 60 forming one layer of the mesh and parallel ribs 62 forming a second layer of the mesh. The ribs 60 are considerably taller than they are wide while the ribs 62 are generally square in cross-section. By making the ribs 60 rectangular, the cross-section of the mold cavities forming the ribs 60 can be made sufficiently great to feed molten thermoplastic completely throughout these cavities and the cavities forming the ribs 62, even though the width of the ribs 60 and the height and width of the ribs 62 are quite small, the cavities forming the ribs 60 acting as runners to supply injected thermoplastic to the cavities forming the ribs 62. Small mesh size and high percent open area are important in certain filtering application such as lint filters for use in clothes driers. With this technique, thermoplastic mesh can be made having at least 50 percent open area and a mesh size of at least 14 mesh. To do this requires the ribs 60 and 62 to be about 20 thousandths of an inch wide and spaced about 50 thousandths of an inch apart. The thermoplastic mesh pattern of FIGS. 8 and 9 can be oriented with respect to the frame 25 as shown, or with the finer ribs 62 running the length of the filter element 20 to provide greater flexibility. Other orientations can also be used.

Figure 10:
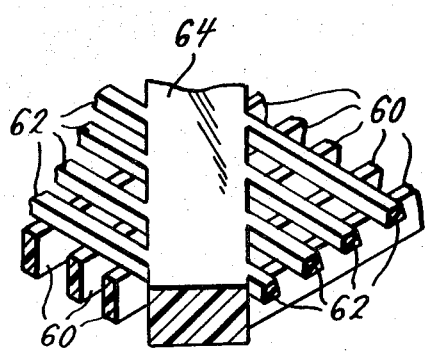
FIG. 10 is an enlarged view of a section of an alternate thermoplastic mesh pattern for use in the filter element of this invention.

In FIG. 10, there is shown an alternate thermoplastic mesh pattern for use as the filter medium 44. This pattern is identical to that shown in FIGS. 8 and 9 except that the layer formed by the ribs 62 has spaced diagonal ribs 64 considerably wider than either the ribs 60 or 62. The ribs 64 act as runners to supply injected thermoplastic to the mold cavities forming the much narrower ribs 60 and 62. They also can be oriented to run normally between the sides 21 and 22 of the frame 25 at the locations 54 to provide still greater support to the sides of the frame.

A handle 66 preferably of molded thermoplastic, although other suitable materials could be used, is fastened to the wall 28 by a series of tabs 68 extending from a rear wall 69 of the handle 66 through the vertical slots 30 in the wall 28. The tabs 68 are formed at their ends in a shoulder 70 on one of its sides which, with the flap 32 bearing against the other side of the tab 68, engages the rear surface of the wall 28 to provide a quick snap connection for holding the handle 66 to the wall 28. A sealing pad 75 of felt to other suitable material is held between the rear wall 69 of the handle 66 and the wall 28 by the tab connections 68. The pad 65 is optional and used only to seal in the air to be filtered. Where the pad 75 is not used, the handle 66 can be molded of thermoplastic integrally with the frame 25 and filter medium 44 to form a completely unitary filter element.

From the foregoing, it is apparent that this invention provides a novel, completely unitary, thermoplastic filter element greatly superior to those of the prior art. The use of corrugated thermoplastic mesh as the filter medium formed integrally with the frame, provides an element that is flexible and yet retains its shape when curved. Neither special vertical studs nor metallic bands are necessary. These features together with the one-step molding process greatly reduce the cost of these kinds of articles.

Various changes and modifications may be made within this invention, as will be readily apparent to those skilled in the art. Such changes and modifications are within the scope and teaching of this invention as defined by the claims appended hereto.

What is claimed is:

1. A flexible filter element comprising opposing, substantially parallel, side members, each side member being of a predetermined, substantially fixed length, corrugated mesh covering the area between the side members, each corrugation being oriented with its longitudinal extent substantially normal to the side members, there being a plurality of said corrugations along the length of the element, the side members and mesh being molded of plastic to form a unitary structure and being flexible for bending about an axis parallel to the longitudinal extents of the corrugations, and wherein the corrugated mesh is further characterized as having corrugations of greatest depth approximately midway between the side members and which corrugations smoothly decrease in depth to zero nearest the side members.

2. The filter element of claim 1 wherein each corrugation defines a smooth continuous arc in cross section taken through its longitudinal extent at its peak.

3. The element of claim 1 wherein the side members define a substantially planar frame portion, and some of the corrugation peaks are formed in the same plane as the frame portion.

4. The element of claim 3 wherein the mesh includes a first set of ribs, a second set of ribs inclined with respect to the first set, and a third set of ribs substantially wider than those of the first and second sets and extending across the element at those locations where some of the corrugation peaks are formed in the same plane as the frame portion.

5. The element of claim 4 wherein the mesh size is at least about 14 mesh and its percent open area is at least about 50 percent.

6. The element of claim 1 including a handle, and means for mounting the handle at one end of the element.

7. The element of claim 1 wherein the mesh includes a first set of ribs, and a second set of ribs inclined with respect to the first set, the ribs in each set being parallel, and the ribs in one set being normal to the side members.

8. The element of claim 1 wherein the mesh size is at least about 14 mesh, and its percent open area is at least about 50 percent.

* * * * *